United States Patent
Ikeda et al.

(10) Patent No.: US 6,732,840 B2
(45) Date of Patent: May 11, 2004

(54) BRAKE CABLE CONNECTING APPARATUS FOR A DRUM BRAKE DEVICE

(75) Inventors: Takashi Ikeda, Owariasahi (JP); Katsuhisa Kurihara, Nagoya (JP)

(73) Assignee: Nisshinbo Industries Inc., Tokyo (JP)

( * ) Notice: Subject to any disclaimer, the term of this patent is extended or adjusted under 35 U.S.C. 154(b) by 0 days.

(21) Appl. No.: 10/157,191

(22) Filed: May 30, 2002

(65) Prior Publication Data

US 2002/0185341 A1 Dec. 12, 2002

(30) Foreign Application Priority Data

Jun. 8, 2001 (JP) ........................................ 2001-174216

(51) Int. Cl.[7] ................................................ B60T 7/00
(52) U.S. Cl. .................... 188/2 D; 188/106 A; 188/325; 74/502.6
(58) Field of Search ................................ 188/105, 2 D, 188/74, 78, 106 A, 106 F, 325–328; 74/502.6, 502.4, 500.5

(56) References Cited

U.S. PATENT DOCUMENTS 3,572,476 A * 3/1971 Laverdant .................. 188/216
5,002,159 A * 3/1991 Brix et al. ................... 188/2 D
5,456,338 A * 10/1995 Belisle et al. ............. 188/79.61
6,241,051 B1 * 6/2001 Ohnishi et al. ............. 188/2 D
6,318,207 B1 * 11/2001 Asai et al. .................. 74/502.6

FOREIGN PATENT DOCUMENTS

JP        A 2000-108855        4/2000

* cited by examiner

*Primary Examiner*—Pam Rodriguez
(74) *Attorney, Agent, or Firm*—Apex Juris, pllc; Tracy M. Heims

(57) ABSTRACT

A brake cable connecting apparatus of a brake-actuating mechanism for a drum brake is mainly composed of a brake lever (22) and a strut (21). A cable end (24*a*) of a brake cable (24) is snapped into a free end (22*e*) of the brake lever (22) when the brake cable (24) is pulled in the cable operating direction against a spring force of a return spring (15) and disassembled therefrom when the brake cable (24) is removed from the free end (22*e*) while the brake lever (22) is pressed by a tool (30). A guide section (22*h*), for supporting a top of the tool (30), is formed on the brake lever (22) at a side relative to the cable releasing direction.

3 Claims, 12 Drawing Sheets

BRAKE CABLE CONNECTING APPARATUS FOR A DRUM BRAKE DEVICE

BACKGROUND OF INVENTION

1. Field of Invention

This invention relates to a brake-actuating mechanism for a drum brake device, designed to mechanically move a pair of brake shoes away from each other in response to operation of a brake lever. More particularly, it relates to a brake cable connecting apparatus designed to prevent an inadvertent disconnection of a brake cable from the brake lever, even during the transportation of the drum brake device with the brake cable already connected to the brake lever of the brake-actuating mechanism and to independently disconnect the brake cable from the brake lever without disassembling any associated part.

2. Description of the Related Art

One conventional brake cable connecting apparatus in a brake-actuating mechanism, as described above, is illustrated in FIGS. 14 and 15, and is disclosed in the Japanese Provisional Patent Publication No. 2000-108855. In the figures, a strut, a brake lever and a brake cable are identified by reference numerals 1, 2 and 3 respectively. The strut 1 and the brake lever 2 define a brake-actuating mechanism. The strut 1 has a notched groove 1a at one end thereof, with which one brake shoe (not shown in the figures) engages. The brake lever 2 is pivotally attached to the other end of the strut 1 at a proximal end thereof with a pivot pin 4 and has a notched groove 2a at the proximal end thereof adjacent to the pivot pin 4, with which the other brake shoe (not shown in the figures) engages. Cable end engagement grooves 2b are formed on a pair of free ends of the brake lever 2, with which a cable end 3a of the brake cable 3 engages in the cable operating direction as shown in FIG. 15.

In the above construction, if a cable operating force as shown in the direction of arrow "W" is applied to the brake lever 2 via the brake cable 3, the brake lever 2 rotates around the pivot pin 4 in a corresponding direction, thereby pushing the associated brake shoe (not shown in the figures) leftward.

At the same time, such pivotal movement of the brake lever 2 around the pivot pin 4, as described above, furnishes the strut 1 with a counteracting force via the pivot pin 4, thereby pushing the strut 1 together with the associated brake shoe (not shown in the figures) rightward.

Due to the movement of both brake shoes moving away from each other, the brake shoes are pushed against an inner circumferential surface of a brake drum (not shown in the figure), thereby providing a predetermined braking action.

Figure 14:
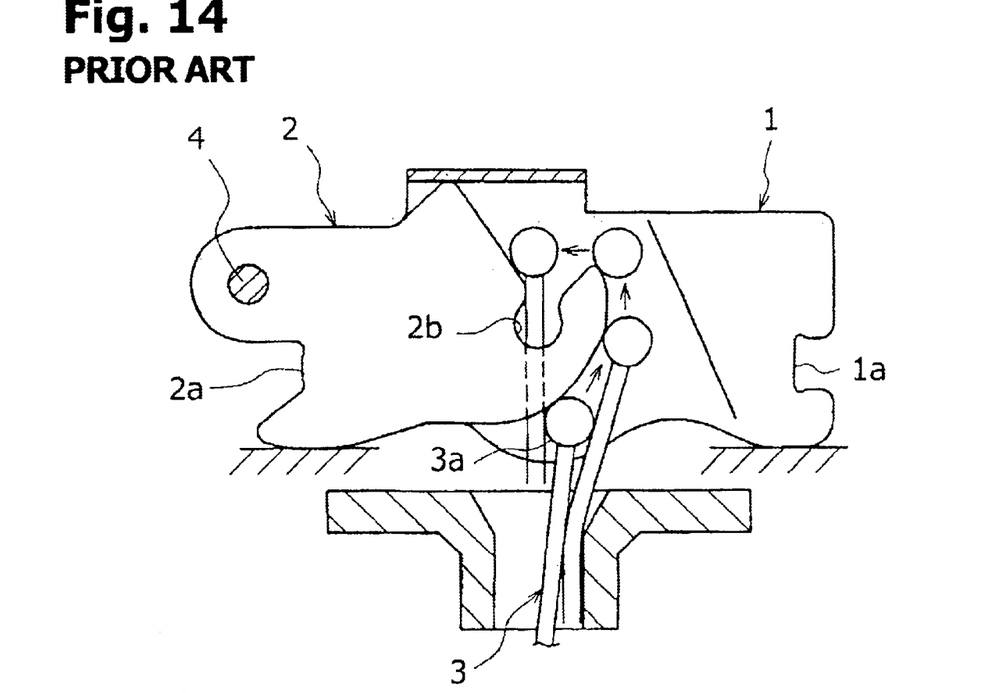
FIG. 14 is a longitudinal sectional view illustrating a process of inserting a brake cable to a connecting apparatus of a conventional brake-actuating mechanism.
Figure 15:
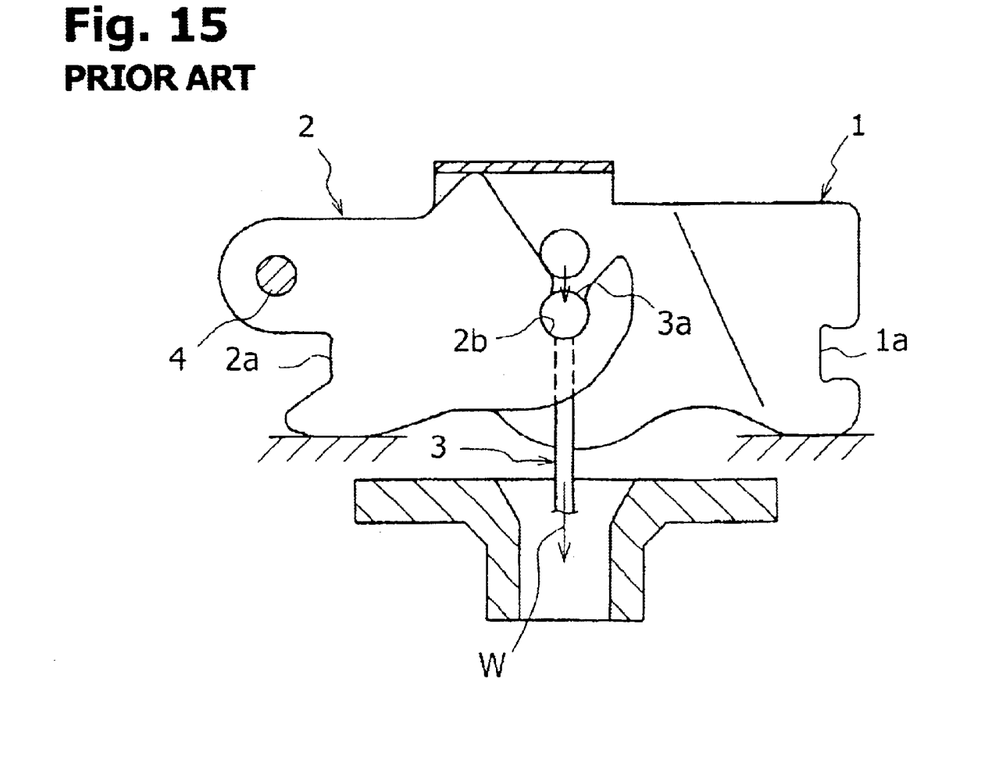
FIG. 15 is a longitudinal sectional view illustrating a process of engaging the cable end with a cable end engagement groove by pulling the brake cable in the cable operating direction after inserting the brake cable to the conventional brake-actuating mechanism.

When the cable end 3a of the brake cable 3 first engages with the engagement grooves 2b on the free ends of the brake lever 2, the cable end 3a is temporarily positioned above the engagement grooves 2b according to a process as shown in FIG. 14 and then passes through a slightly narrow clearance in the brake lever 2, thereby snapping the cable end 3a in the engagement groove 2b according to a process as shown in FIG. 15.

In this type of drum brake device, for the purpose of inspecting or exchanging the brake cable while the drum brake device is being mounted on a vehicle, the brake cable already connected to the brake lever needs to be disconnected.

However, in the above-described conventional drum brake device, disconnection of the brake cable is exceedingly difficult. In order to disconnect the brake cable, it is necessary to dismount the brake drum and to disassemble the drum brake device and the brake-actuating mechanism. Accordingly, it is difficult to prevent either of or both the inadvertent disconnection of the brake cable from the brake lever while transporting the drum brake device with the brake cable and the disconnection of the brake cable independently from the brake lever under the condition where the brake drum and the drum brake device are already mounted on the vehicle.

An object of a first embodiment of the invention is to provide the brake cable connecting apparatus preventing the inadvertent disconnection of the brake cable from the brake lever while transporting the drum brake with the brake cable and the disconnection of the brake cable independently from the brake lever without dismounting of the brake drum and disassembling the drum brake device and the brake-actuating mechanism.

An object of a second embodiment of the invention is to provide the brake cable connecting apparatus achieving the same level of effectiveness as in the first invention by way of allocating a groove on the brake lever for supporting the top of the tool which pushes the brake lever.

An object of a third embodiment of the invention is to provide the brake cable connecting apparatus achieving the same level of effectiveness as in the first invention by way of allocating a notch on the brake lever for guiding the top of the tool which pushes the brake lever.

SUMMARY OF THE INVENTION

In a brake actuating mechanism comprising a brake lever and a strut, that rotate relatively around their pivotally attached section in order to move the brake shoes away from each other when the cable operating force of the brake cable is transmitted to the brake lever via the cable end, on the occasion of engaging the cable end with the free end of the brake lever, the brake cable is lightly pulled in the cable operating direction against a springing force of a return spring, thereby engaging the cable end with the free end of the brake lever. If the cable end needs to be disengaged from the brake lever, the above process of engaging the cable end is reversed, i.e., the brake cable is pushed in the cable releasing direction and at the same time the brake lever and the strut relatively rotate around their pivotally attached section to move the brake shoes away from each other so as to allow movement of the cable end.

In the first embodiment of the invention, upon slightly pulling the brake cable in the cable operating direction against a springing force of a return spring, the free end of the brake lever is displaced to form a space allowing the cable end to pass and to be positioned on the free end of the brake lever; then the contracting force of the return spring brings the free end of the brake lever back to the initial position, thereby preventing the inadvertent disengagement of the cable end.

The first embodiment of the invention also has a guide section for supporting a top of a tool, formed on a surface of the brake lever at a side of the cable releasing direction, to press the brake lever in the cable operating direction by applying an external force by a tool, such as a screw driver, from outside of the brake to cause the relative rotation of the brake lever and the strut around their pivotally attached sections.

Accordingly, the inadvertent disengagement of the cable end from the brake lever while transporting the drum brake device with the brake cable is prevented, thereby eliminating the possibility of misassembling the drum brake device when mounting on a vehicle and also reducing the time for assembly because it is not necessary to reassemble the cable end.

If the brake cable is disconnected for an exchange, neither dismounting the brake drum nor disassembling the components in the brake device is necessary thereby facilitating the process of and reducing the time for the disconnection of the brake cable. The second embodiment of the invention has a groove in the free end of the brake lever to be used as a guide section for accurately supporting a top of a tool and easily pressing the brake lever, which makes this process more accurate and safer, and therefore it achieves the same level of effectiveness as in the first embodiment of the invention more effectively. The third embodiment of the invention has a notch in the free end of the brake lever as a guide section for accurately supporting a top of a tool and easily pressing the brake lever, which makes this process more accurate and safer, and therefore it achieves the same level of effectiveness as in the first embodiment of the invention more effectively.

BRIEF DESCRIPTION OF THE DRAWING

The above and other objects and the attendant advantages of the present invention will become readily apparent by reference to the following detailed description when considered in conjunction with the accompanying drawings.

DETAILED DESCRIPTION OF THE PREFERRED EMBODIMENT

A first example of the present invention will now be described in detail with reference to the drawings.

Figure 1:
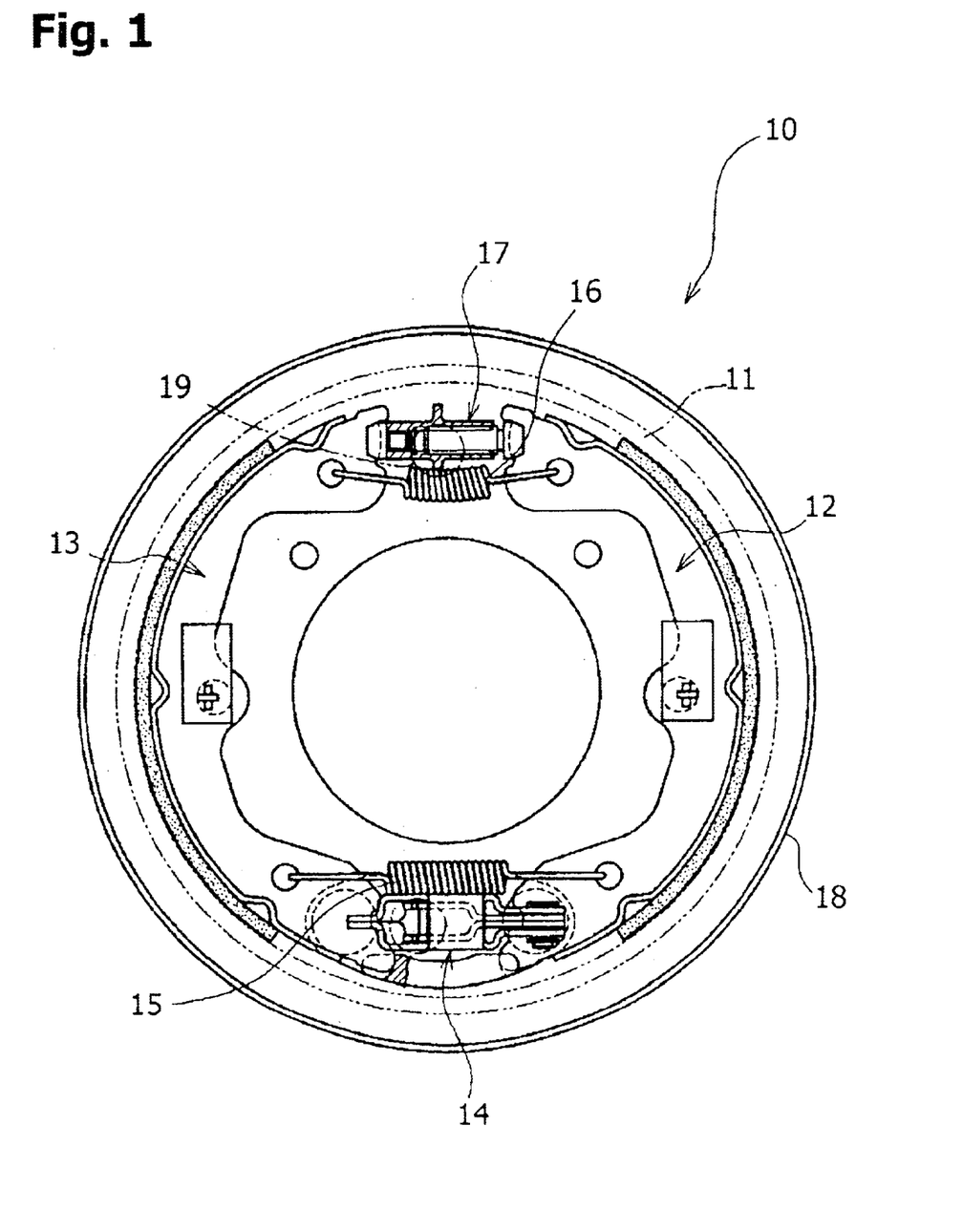
FIG. 1 is a plan view illustrating a drum brake device having a brake-actuating mechanism with a brake cable connecting apparatus according to a first example.

A drum brake device 10 with a brake cable connecting apparatus according to one example is illustrated in FIG. 1.

Components of the drum brake device 10 in FIG. 1 are a pair of brake shoes 12, 13 positioned inside of a brake drum 11, a brake-actuating mechanism 14, shoe return springs 15, 16, and an adjuster 17, all mounted on a back plate 18. The back plate 18 is fixed on a stationary portion of a vehicle and the brake drum 11 is fixed on a vehicle rotation axle. The brake-actuating mechanism 14 is activated upon operating a brake cable 24 shown in FIG. 3, just like an example of the conventional device shown in FIGS. 14 and 15.

The adjuster 17 for adjusting the clearance between an inner circumferential surface of the brake drum 11 and the brake shoes 12, 13 is operated by utilizing an adjustment hole 19 formed on the brake drum 11.

Figure 2:
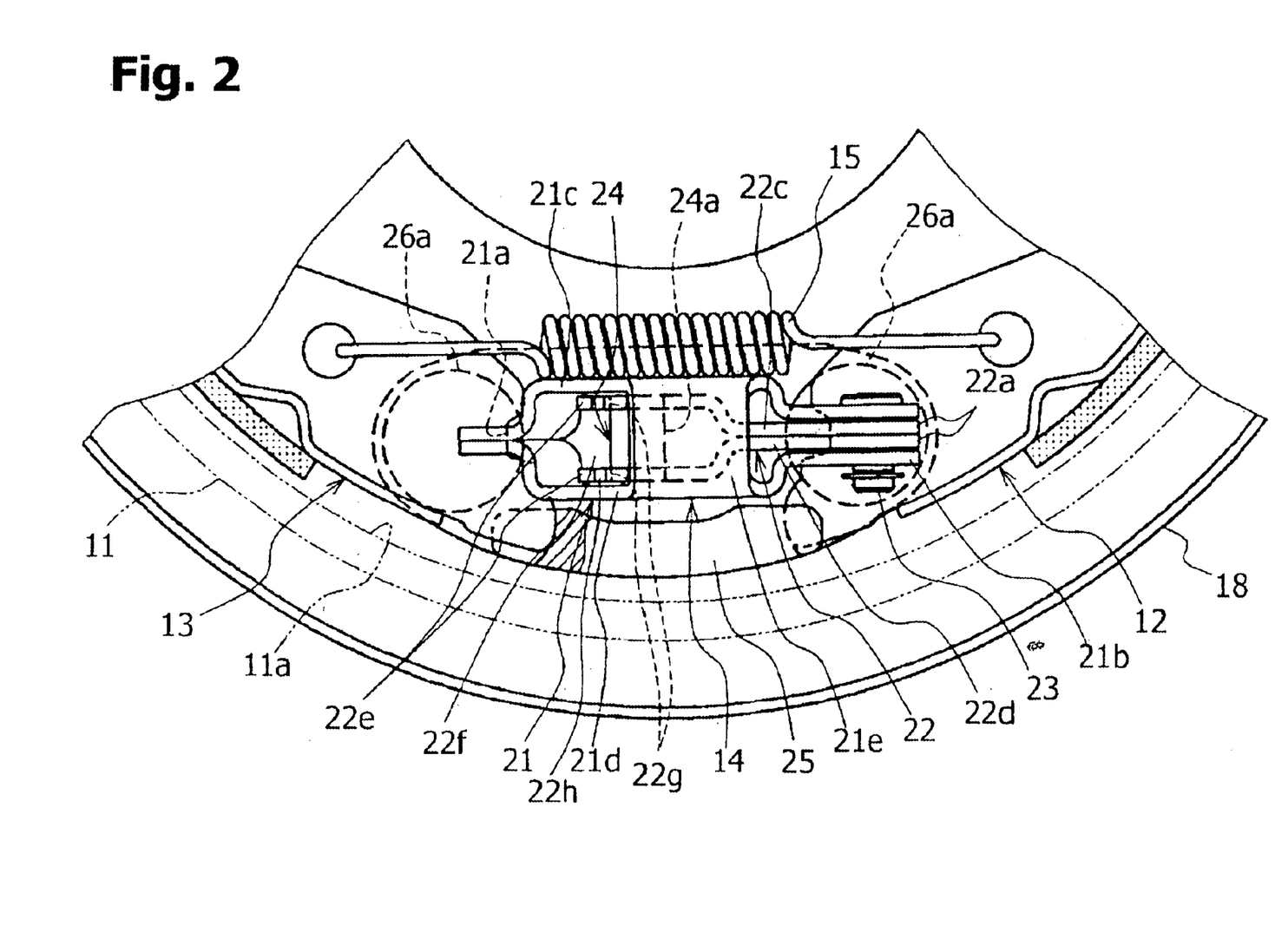
FIG. 2 is a plan view illustrating an essential part of the brake-actuating mechanism of the drum brake shown in FIG. 1.
Figure 3:
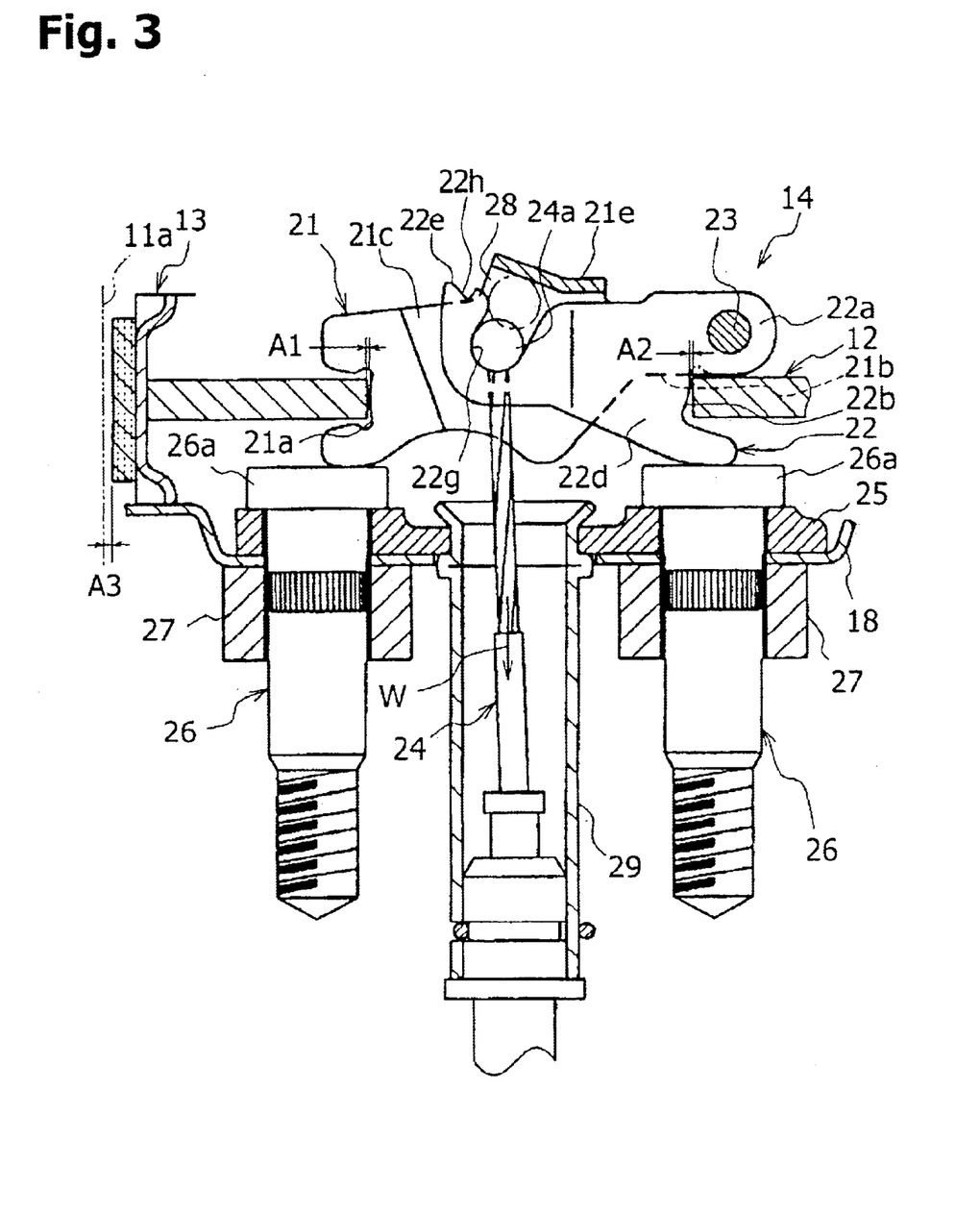
FIG. 3 is a longitudinal sectional view of FIG. 2.

Details of the brake-actuating mechanism 14 are illustrated in FIG. 2 and FIG. 3. FIG. 3 is a cross section view of FIG. 2. The brake-actuating mechanism 14 in FIG. 2 mainly comprises a strut 21 and a brake lever 22.

The strut 21 is disposed between respective operating ends of the brake shoes 12, 13. A brake shoe engagement groove 21a is formed at one end of the strut 21 so as to be engaged with one brake shoe 13.

A proximal end 22a of the brake lever 22 is pivotally attached to the other end 21b of the strut 21 by means of a pivot pin 23. A brake shoe engagement groove 22b is formed adjacent to the pivotally attached section so as to be engaged with the other brake shoe 12.

The strut 21 is formed as a rectangular frame body by bending a piece of a plate. The rectangular frame body includes a pair of opposed sidewalls 21c, 21d closely superposed by means of spot welding at one end of the strut 21 where the groove 21a is formed, but spaced apart from each other at the other end 21b of the strut 21 so as to sandwich the proximal end 22a of the brake lever 22 between the sidewalls 21c, 21d. The sidewalls 21c, 21d are spaced apart from each other between both ends of the strut 21 by a distance therebetween greater than that at the other end 21b of the strut 21, but further are connected together through a bridge portion 21e that spans between the sidewalls 21c, 21d.

The brake lever 22 includes a pair of opposed plate members 22c, 22d closely superposed by mean of spot welding at the proximal end 22a, but spaced apart from each other at free ends 22e of the brake lever 22 so as to form forked legs with a space 22f as shown in FIG. 2. The free ends 22e are interposed between the spaced-apart sidewalls 21c, 21d.

Width of the space 22f at the free ends 22e, i.e., a distance between the plate members 22c, 22d, is defined in relation to the shape and size of the cable end 24a of the brake cable 24, which is connected to the free ends 22e. The cable end 24a forms an elongated, cylindrical shape having a longitudinal dimension thereof greater than a diameter thereof, and assumes a rectangular shape as shown in FIG. 2 when viewed in the longitudinal direction of the brake cable 24. The width of the space 22f is smaller than the longitudinal dimension of the cable end 24a, but is greater than the diameter of the cable end 24a. As shown in FIGS. 2 and 3, such a construction allows the cable end 24a to be engaged with the free ends 22e in the cable operating direction.

Furthermore, the plate members 22c, 22d have respective cable end engagement recesses 22g formed at the free ends 22e so as to be engaged with the elongated cylindrical cable end 24a. Each of the cable end engagement recesses 22g has a bottom surface curved into an arc-shaped engagement surface in accordance with a circumferential curvature of the cable end 24a. As shown in FIG. 1, the shoe return spring 15 is extended between the respective operating ends of the brake shoes 12, 13. An anchor block 25 is positioned in contact with both brake shoes 12, 13 adjacent to the operating ends thereof. As shown in FIG. 3, the anchor block 25 is secured together with the back plate 18 to the stationary portion of the vehicle, such as a knuckle, via a spacer 27 by means of a pair of bolts 26. The brake-actuating mechanism 14 is disposed on heads 26a of the bolts 26.

In the above construction, when a cable operating force, indicated by arrow "W" in FIG. 3, is applied on the brake lever 22 via the brake cable 24, the brake lever 22 is rotated in a counterclockwise direction about the pivot pin 23, thereby pushing the brake shoe 12 rightward. At the same time, such pivotal movement of the brake lever 22 imparts a counteracting force to the strut 21 via the pivot pin 23, thereby pushing the strut 21 together with the brake shoe 13 leftward in FIG. 3. The brake shoes 12, 13 move away from each other and are pressed against an inner circumferential surface 11a of the brake drum 11 as shown by the two-dot chain line, thereby providing a predetermined braking action. The brake-actuating mechanism 14 with the brake cable connecting apparatus, illustrated in the figures, shows that in order to prevent the inadvertent disengagement of the cable end 24a from the cable end engagement recesses 22g while transporting the drum brake device, as shown in FIG. 3, the bridge portion 21e of the strut 21 is extended above the free ends 22e, thereby functioning as a cable end stopper, thus preventing the inadvertent disengagement of the cable end 24a from the engagement recesses 22g.

That is, the bridge portion (i.e., a cable end stopper) 21e of the strut 21 is extended above the free ends 22e of the brake lever 22 leaving a slight clearance 28 between the bridge portion 21e and the free ends 22e that is smaller than the diameter of the cable end 24a. Accordingly, even if the cable end 24a is about to disengage from the cable end engagement recesses 22g as shown by the two-dot chain line of FIG. 3, further movement of the cable end 24a is prevented by cooperation between the bridge portion 21e and the free ends 22e.

Therefore, the brake-actuating mechanism 14 in the figures prevents the inadvertent disconnection of the brake cable 24, while transporting the drum brake device prior to its assembly on the vehicle, from the free ends 22e of the brake lever 22 of the brake-actuating mechanism 14, thereby also preventing a decrease in work efficiency for connecting the brake cable 24.

In this example, the clearance 28 reserved between the bridge portion 21e of the strut 21 and the free ends 22e of the brake lever 22 is designed to allow the engagement of the cable end 24a with the free ends 22e and to be smaller than the diameter of the cable end 24a, as described above.

Accordingly, the initial or return positions of the brake shoes 12, 13 being urged by the shoe return spring 15 in FIG. 2 are restricted by the anchor block 25, and clearances A1, A2 exist between the brake shoes 12, 13 and the brake shoe engagement grooves 21a, 22b as shown in FIG. 3. If the amount of rotation of the brake lever 22 is sufficient to fill the clearances A1, A2, the clearance 28 is smaller than the diameter of the cable end 24a, thereby assuring the prevention of the inadvertent disengagement of the cable end 24a from the free ends 22e of the brake lever 22. Further rotation of the brake lever 22 spreads the brake shoes 12, 13 open to fill the shoe clearances A3 as shown in FIG. 3 between both brake shoes 12, 13 and the inner circumferential surface 11a of the brake drum 11. The clearance 28 is set to exceed the diameter of the cable end 24a during this operation.

Figure 4:
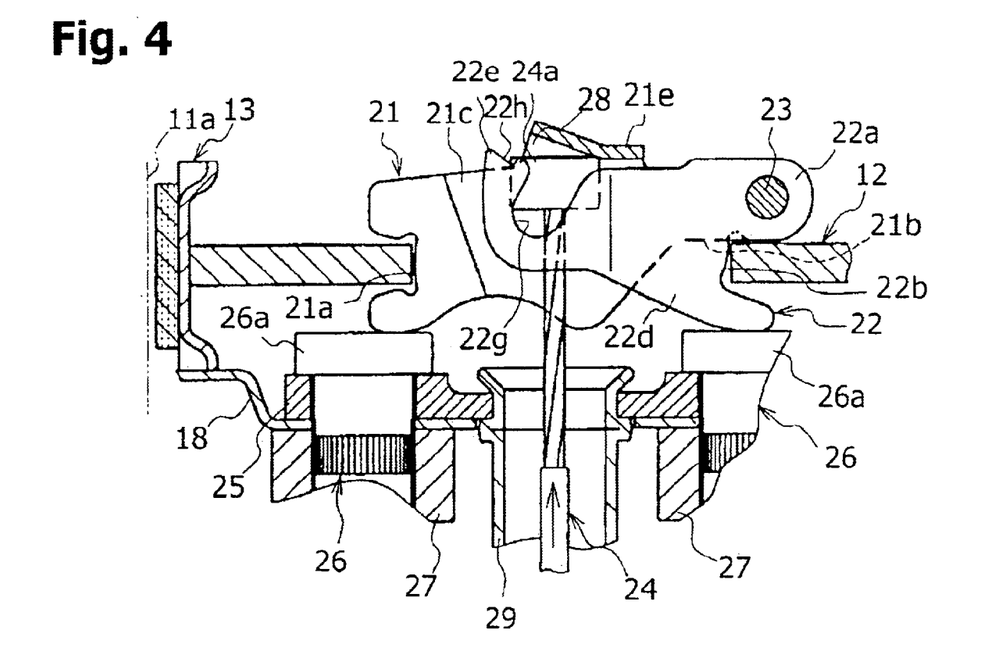
FIG. 4 is a longitudinal sectional view of FIG. 2 illustrating a first step in the progress of connecting the brake cable to the brake-actuating mechanism.

In the above structured brake-actuating mechanism 14, when the cable end 24a is inserted through a guide pipe 29 shown in FIG. 3 and is engaged with the cable end engagement recesses 22g of the brake lever 22, as shown in FIG. 4, the cable end 24a is directed longitudinally parallel to the plate members 22c, 22d (see FIG. 4 showing the plate member 22d) of the brake lever 22, and the cable end 24a proceeds in a cable releasing direction into the space 22f referring to FIG. 2 between the plate members 22c, 22d.

Figure 5:
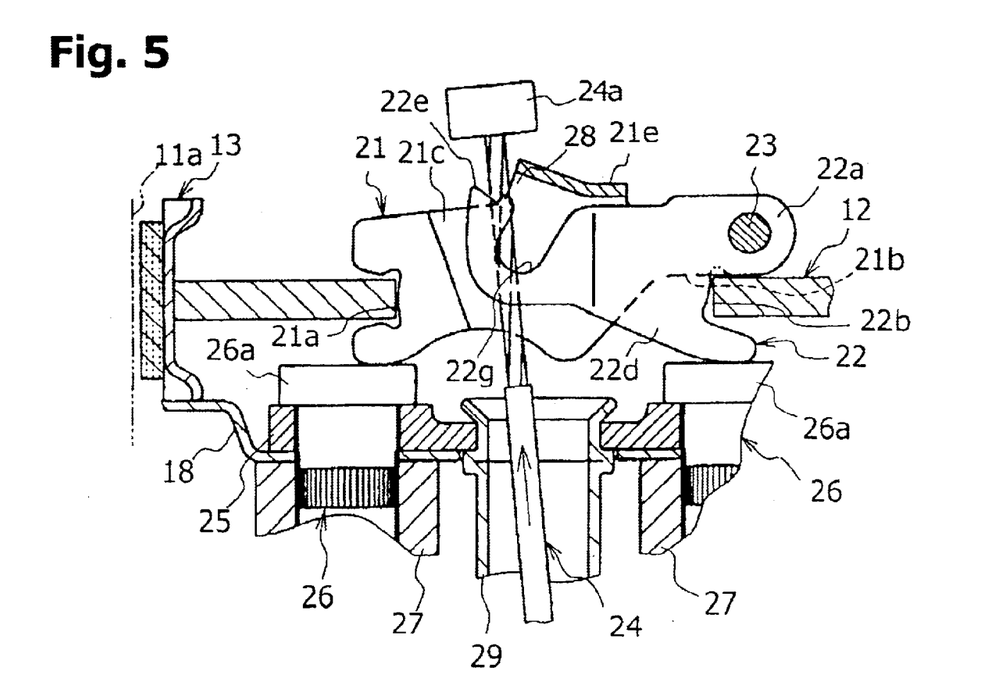
FIG. 5 is a longitudinal sectional view of FIG. 2 illustrating a second step in the progress of connecting the brake cable to the brake-actuating mechanism.

FIG. 4 shows a condition when the cable end 24a is inserted into the space 22f between the plate members 22c, 22d and is contacted with the bridge portion 21e, while FIG. 5 shows a condition when the brake cable 24 projects from the brake-actuating mechanism 14 above the clearance 28 because of further inserting the cable end 24a along the slant of the bridge portion 21e.

Figure 6:
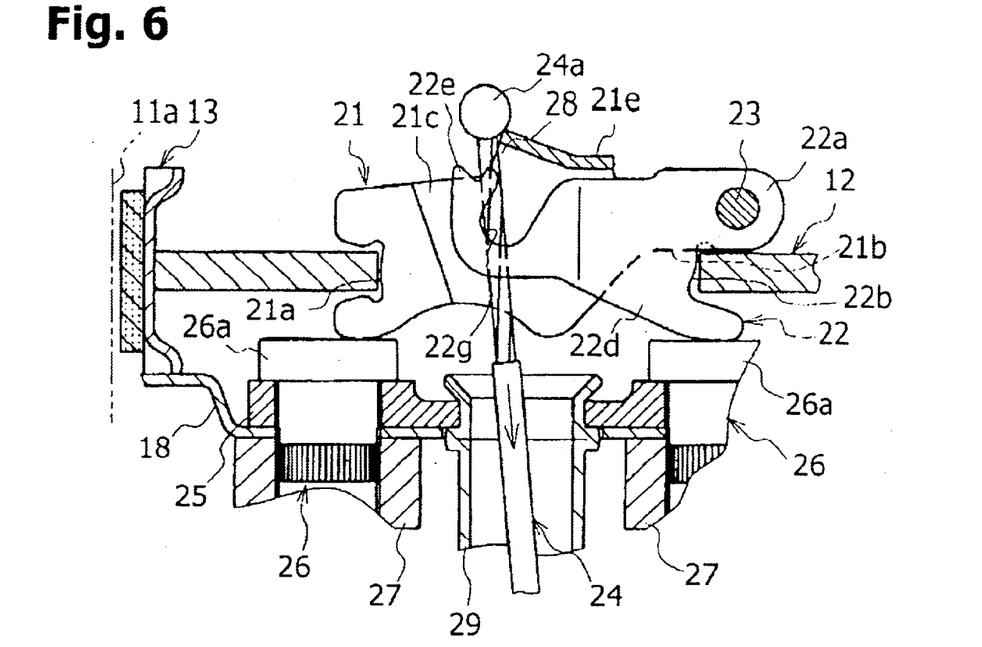
FIG. 6 is a longitudinal sectional view of FIG. 2 illustrating a third step in the progress of connecting the brake cable to the brake-actuating mechanism.

Under this condition, the brake cable 24 is pivoted and rotated 90 degrees so that the cable end 24a is orthogonal to the plate members 22c, 22d and the cable end 24a is operated in the longitudinal direction of the brake cable 24, as shown by the arrow in FIG. 6.

Figure 7:
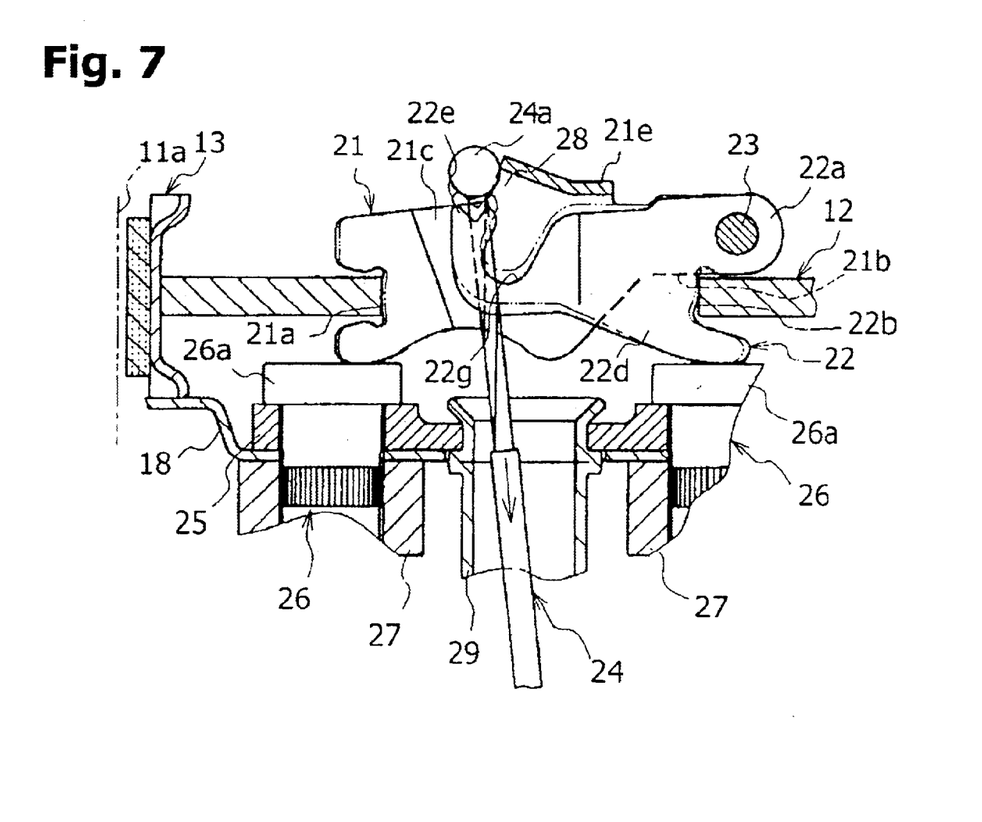
FIG. 7 is a longitudinal sectional view of FIG. 2 illustrating a fourth step in the progress of connecting the brake cable to the brake-actuating mechanism.

The cable end 24a reaches to the clearance 28 between the free ends 22e and the bridge portion 21e, and the brake lever 22 is moved to a position shown by the solid line as shown in FIG. 7 from an initial position shown by the two-dot chain line (corresponding to the brake lever as shown by the solid line in FIGS. 2–6) for the space as A1, A2 in FIG. 3.

Figure 8:
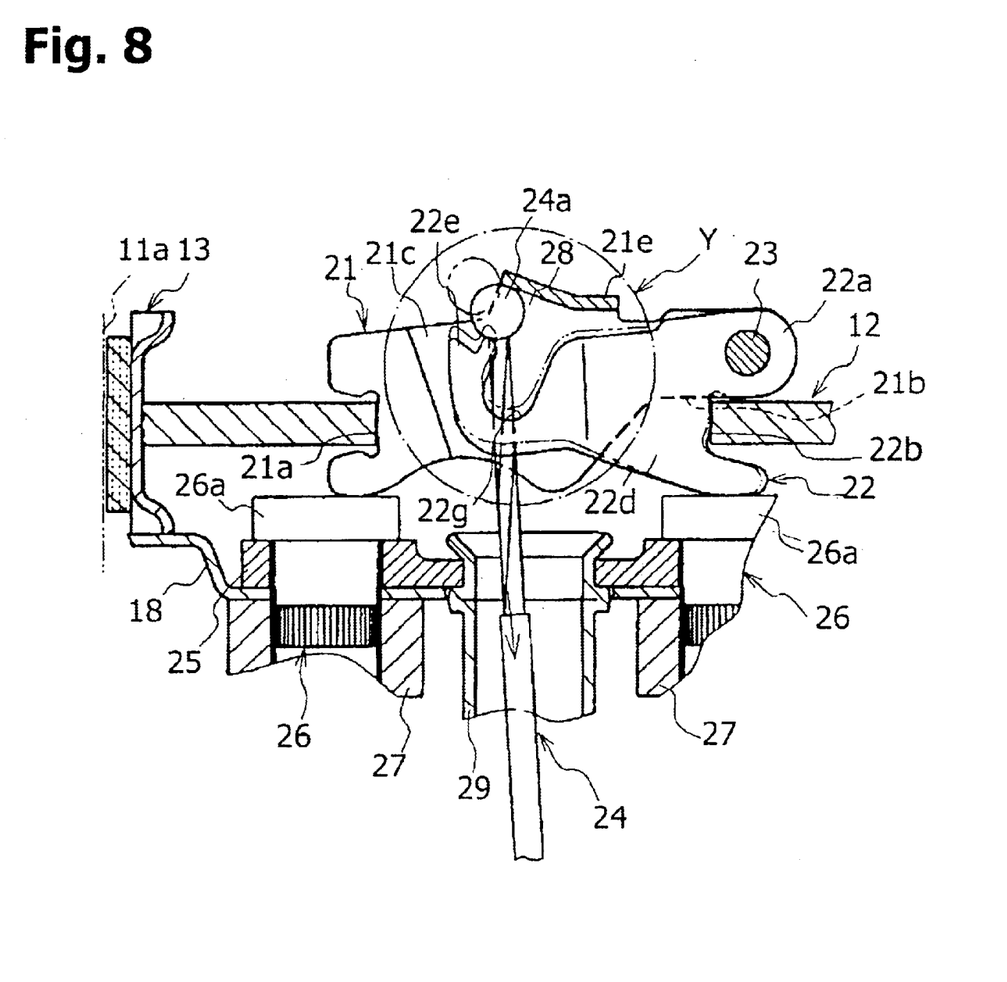
FIG. 8 is a longitudinal sectional view of FIG. 2 illustrating a fifth step in the progress of connecting the brake cable to the brake-actuating mechanism.
Figure 9:
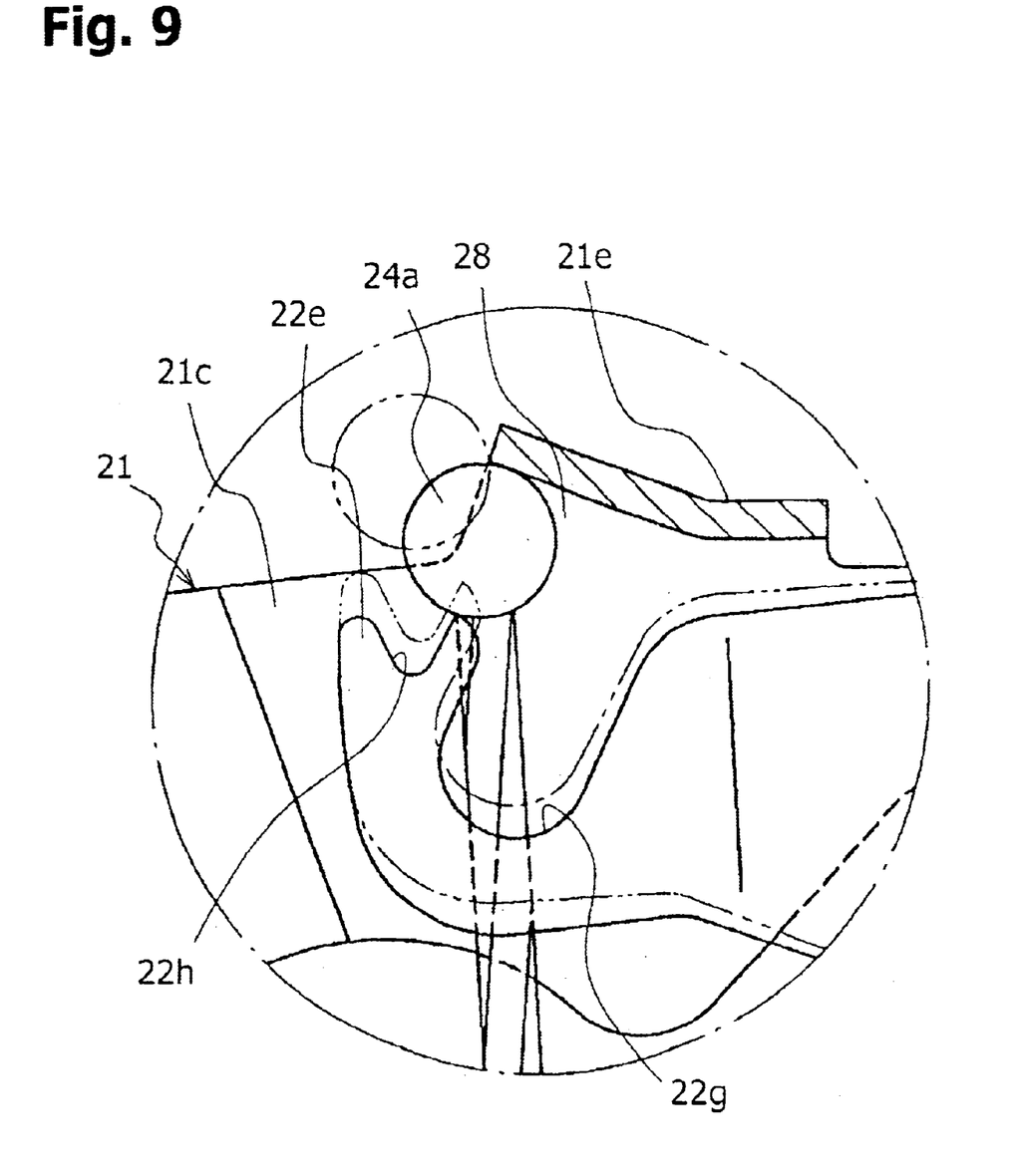
FIG. 9 shows elements of the enlarged section Y of FIG. 8.

If the brake cable 24 is further operated in the cable operating direction, the cable end 24a moves to the solid line from the two-dot chain line in FIGS. 8 and 9 (corresponding to the cable end as shown by the solid line in FIG. 7) with further rotation of the brake lever 22.

Because a resilient force of the shoe return spring 15 as shown in FIG. 2 acts on the strut 21 and the brake lever 22 in a return direction of the brake lever 22 via the brake shoes 12, 13, such rotation of the brake lever 22 is performed against the returning force of the brake lever 22 due to the shoe return spring 15. At this time, until the brake shoes 12, 13 move apart from each other as shown in FIG. 3 to fill the shoe clearance A3 just like shown in FIG. 8, the clearance 28 between the free ends 22e and the bridge portion 21e is to be a sufficient size for passing the cable end 24a through.

Therefore, the cable end 24a is snapped in the cable end engagement recesses 22g finally as shown in FIGS. 2 and 3, and at this time, the brake lever 22 rotates back at least to the position of the solid line in FIG. 7 or the positions in FIGS. 2–6 because of the resilient force of the shoe return spring 15, thereby narrowing the clearance 28 back to the condition smaller than the diameter of the cable end 24a.

Under the condition where the drum brake device 10 of this example is being mounted on the vehicle, when the brake cable 24 only is to be independently disengaged for repair or maintenance, the cable end 24a is moved out from the engagement with the cable end engagement recesses 22g of the brake lever 22 so that the clearance 28 between the free ends 22e and the bridge portion 21e is to become a sufficient size for passing the cable end 24a through as shown in FIGS. 8 and 9.

Hence, in order to secure the sufficient size of the clearance 28 for the cable end 24a to pass therethrough, the strut 21 and the brake lever 22 need to be relatively rotatable around the pivot pin 23 to move the brake shoes 12, 13 away from each other. That is, the strut 21 and the brake lever 22 need to shift from a position marked by the two-dot chain line of FIGS. 8 and 9 to a position marked by the solid line.

In the brake-actuating mechanism 14 with the brake cable connecting apparatus of this example, guiding grooves 22h act as the guide section for piloting a top of a tool, and are formed on the surface of the free ends 22e at the side of cable releasing direction so that the brake cable 24 may be disconnected according to the above-described operational process utilizing a tool, such as a screw driver, from outside the brake.

Figure 10:
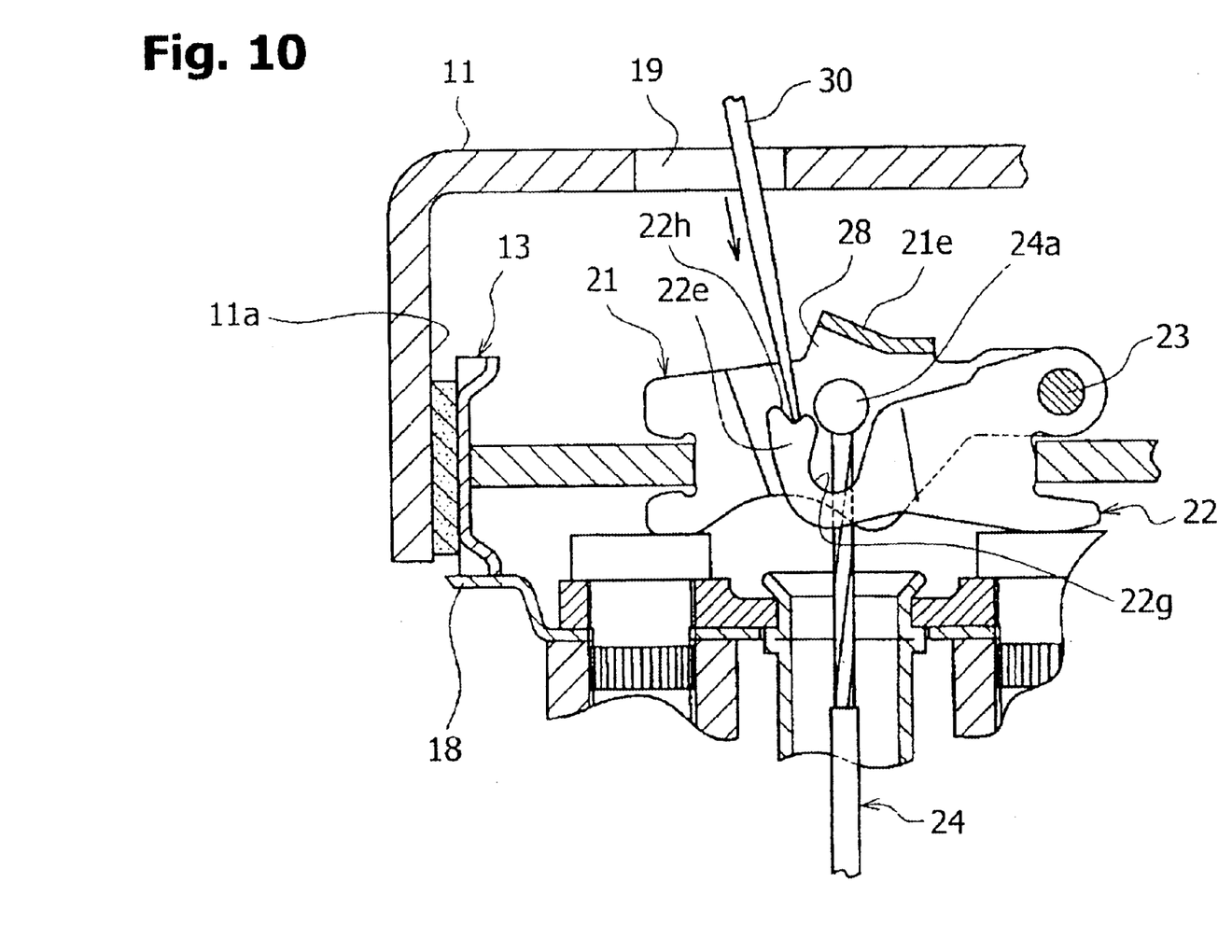
FIG. 10 is a longitudinal sectional view of FIG. 2 illustrating a first step for disconnecting the brake cable from the brake-actuating mechanism.
Figure 11:
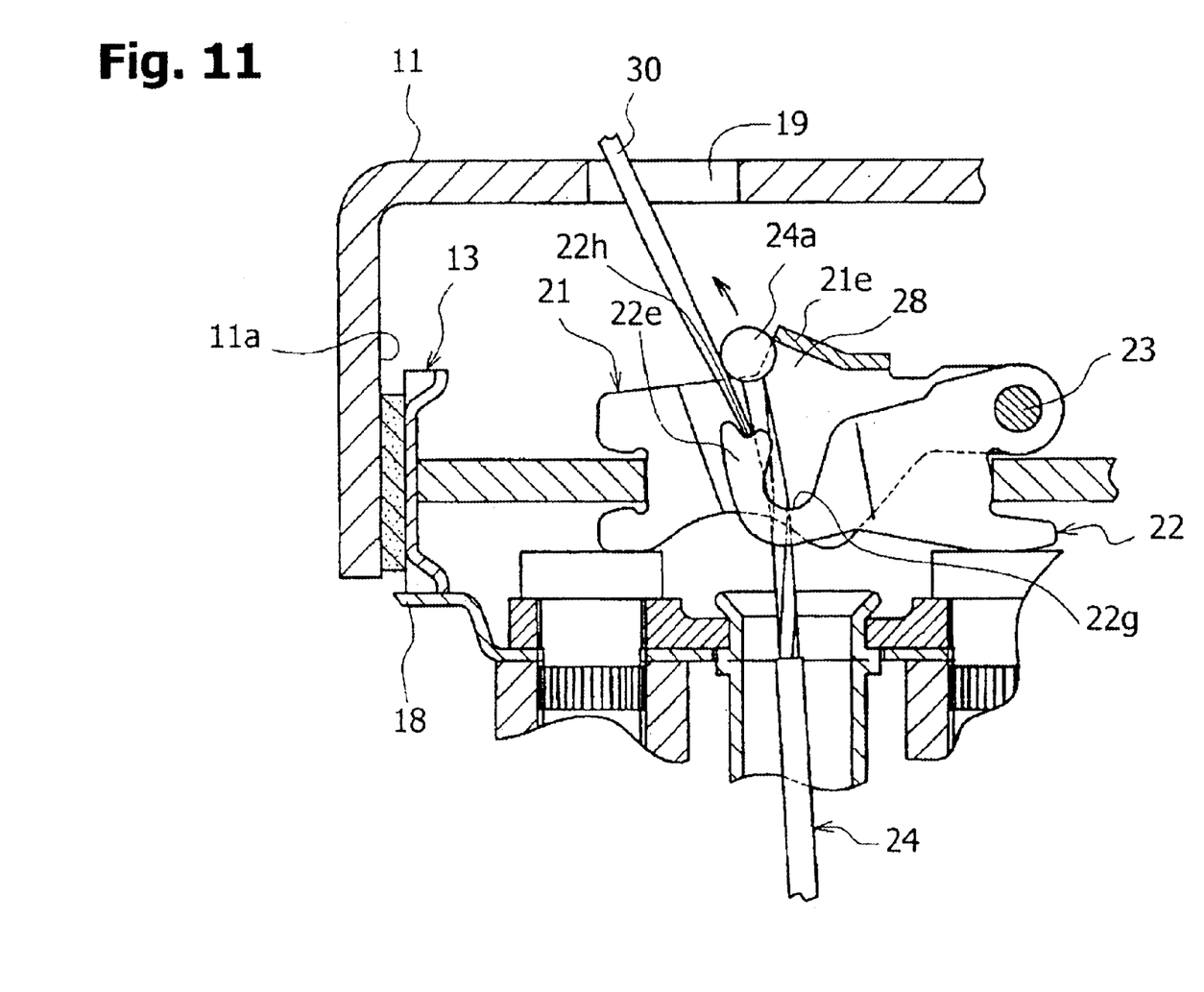
FIG. 11 is a longitudinal sectional view of FIG. 2 illustrating a second step for disconnecting the brake cable from the brake-actuating mechanism.

FIGS. 10 and 11 illustrate the operational process. Such process is explained next.

First, as shown in FIG. 10, a tool 30, such as a screw driver, is inserted from the adjustment hole 19, and the top of the tool 30 is placed in and abutted against the guiding groove 22h of the brake lever 22. The tool 30 is pressed against the free end 22e along an arrow in FIG. 10 so as to rotate the brake lever 22 counterclockwise around the pivot pin 23. At that time, the top of the tool 30 is guided into a bottom of the groove 22h also functioning as a stopper constantly maintaining the position of the tool 30, which gives more accurate and safe operation.

Accordingly, the clearance 28 between the bridge portion 21e of the strut 21 and the free ends 22e of the brake lever 22 becomes sufficient for the cable end 24a to pass therethrough for the cable end 24a to be disengaged from the engagement recesses 22g of the brake lever 22. As shown in FIG. 11, while the tool 30 is being pressed against the brake lever 22, the cable end 24a is moved toward an arrow of the figure to pass the clearance 28 through.

Then, the brake cable 24 is disconnected following the process opposite to the one used above to connect the same.

Forming the grooves 22h as the guide section for piloting the top of the tool 30 on the free ends 22e of the brake lever 22, the brake cable 24 is disconnected by operating the brake cable connecting apparatus from outside of the brake. Especially employing this type of construction, the tool may be inserted from the adjustment hole 19 for the brake cable 24 to be disconnected from the brake lever 22 without disassembling the brake drum 11, thereby facilitating the disassembling process.

Figure 12:
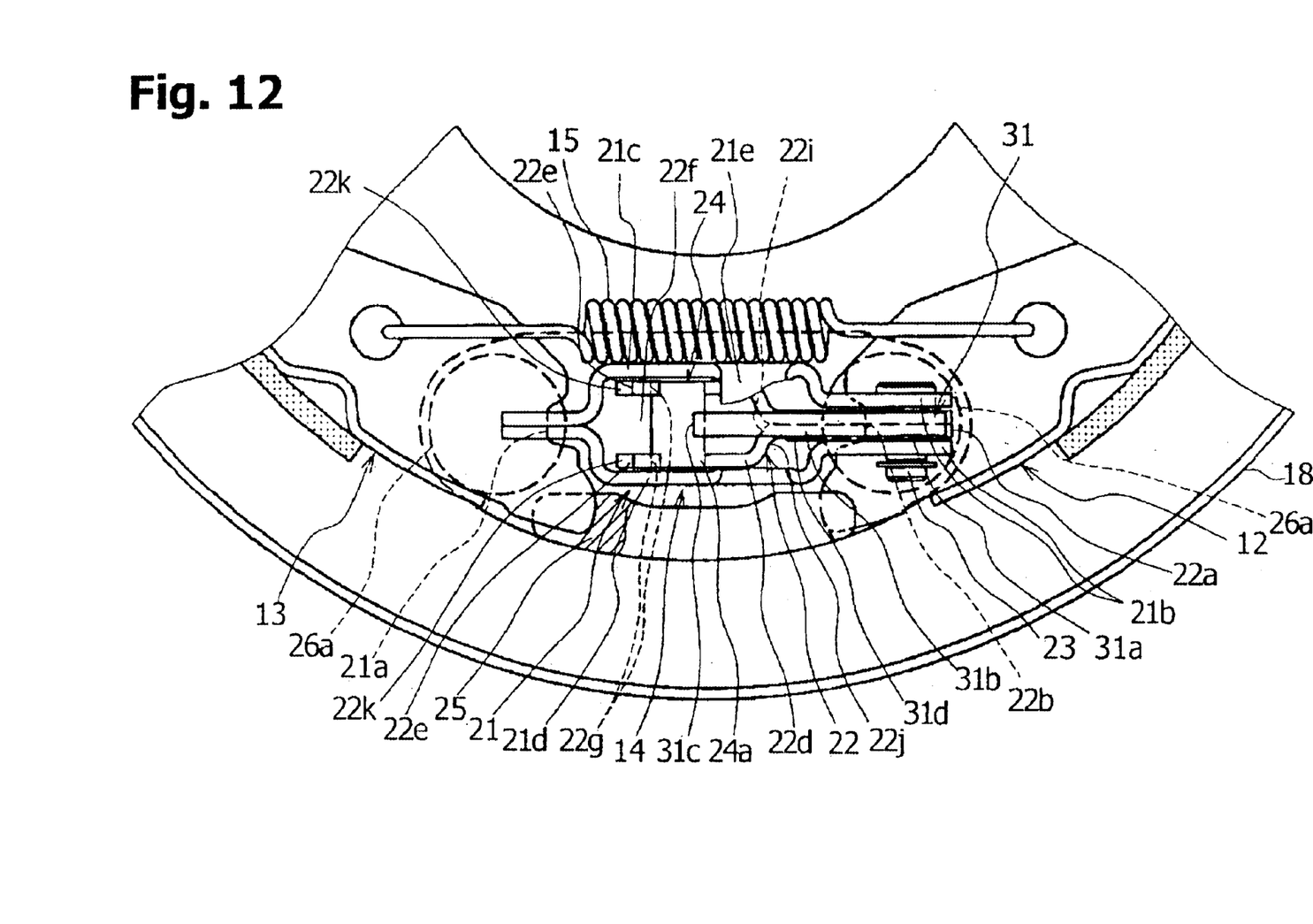
FIG. 12 is a plan view illustrating a part of a brake-actuating mechanism with a brake cable connecting apparatus according to second example.
Figure 13:
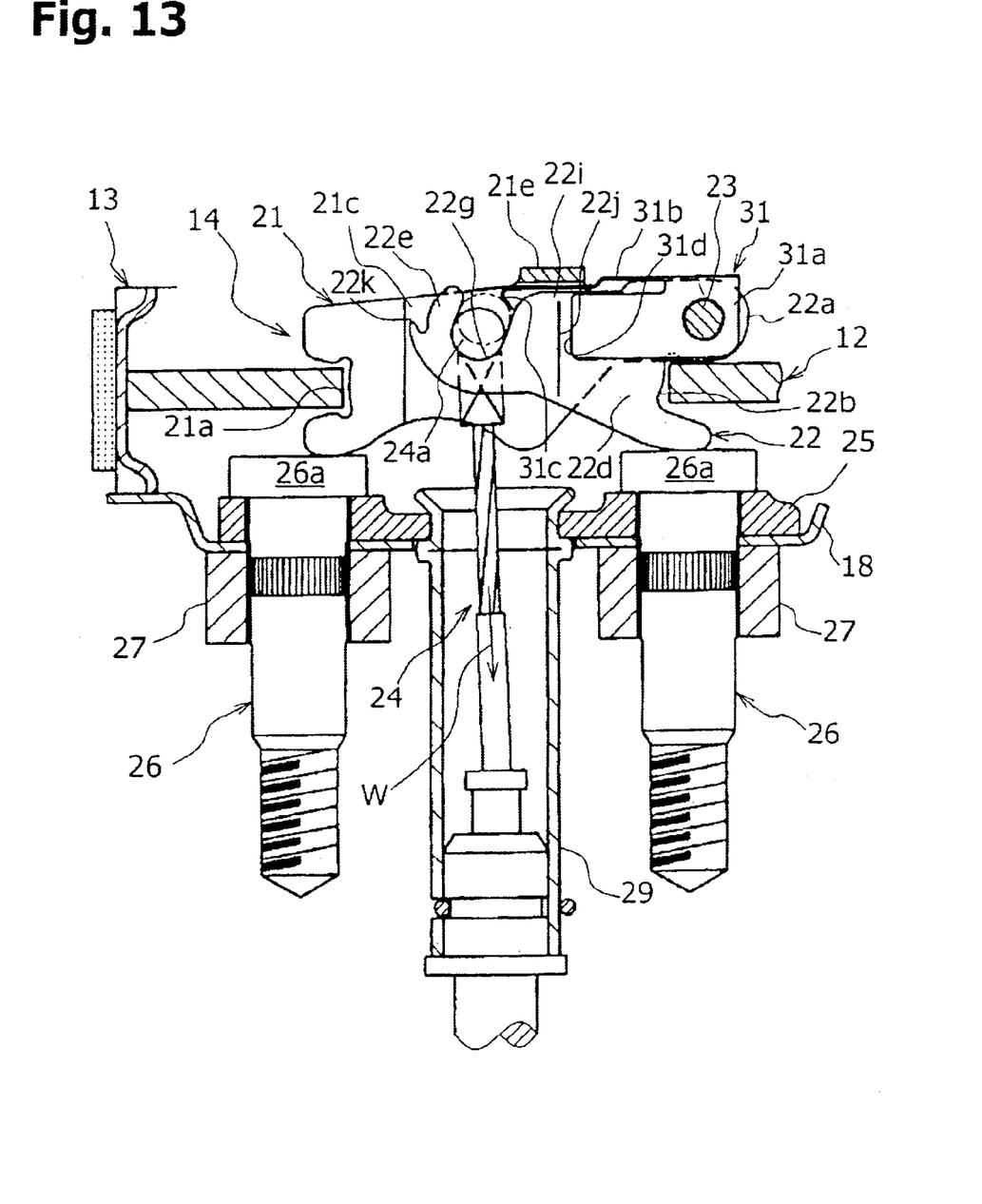
FIG. 13 is a longitudinal sectional view of FIG. 12 illustrating a part of the brake actuating mechanism of the drum brake.

FIGS. 12 and 13 show a brake-actuating mechanism with a brake cable connecting apparatus of another example of this invention.

The brake-actuating mechanism 14 in the figures basically has the same components of the examples in FIGS. 1–11, and the same reference numbers are assigned to common components.

The brake-actuating mechanism 14 of these figures comprises a plate spring 31 to prevent inadvertent disengagement of the cable end 24a positioned on the free ends 22e of the brake lever 22. The plate spring 31 is designed such that a proximate portion 31a is bent into an L-shape that fits around the pivot pin 23 and is sandwiched between the sidewall 21d at the strut side and the brake lever 22, and that a strip piece 31b, positioned between the bridge portion 21e and the brake lever 22, extending from the proximate portion 31a, has a plate surface crossing with the rotational surface of the brake lever 22.

The top end 31c of the strip piece 31b is curved toward the space 22f and is designed to interfere with the cable end 24a to prevent disengagement from the engagement recesses 22g of the brake lever 22.

When the cable end 24a goes into the engagement recesses 22g, the strip piece 31b is received at proximate portions 22i of the free ends 22e such that the strip piece 31b is easily resiliently deformed while the strip piece 31b is received at the bridge portion 21e of the strut adjacent to the top 31c but the strip piece 31b is not easily resiliently deformed when the cable end 24a is about to depart from the engagement recesses 22g.

Further, a top 31d of the L-shaped proximate portion 31a and a stepped portion 22j of the plate member 22d engage, thereby preventing the plate spring 31 from largely rotating relative to the brake lever 22. In this brake-actuating mechanism 14, as the detail is shown in FIG. 13, stepped notches 22k are formed at the free ends 22e of the brake lever 22.

The stepped notch 22k functions as a guide section to pilot the top of the tool inserted from outside of the brake when independently disengaging the brake cable 24. Accordingly, the disconnecting process of the brake cable 24 in this example is the same as the one in FIGS. 10 and 11, and therefore, the explanation is omitted.

While the foregoing invention has been shown and described with reference to several preferred embodiments, it will be understood by those of skill in the art that various changes in form and detail may be made therein without departing from the spirit and scope of this invention.

What we claim is:

1. A brake cable connecting apparatus of a brake-actuating mechanism for a drum brake, the brake-actuating mechanism comprising a strut, engaging with one of a pair of brake shoes at a first end thereof and a brake lever, being pivotally attached to a second end of the strut and engaging with the other of the pair of brake shoes at a proximal end thereof and with a cable end of a brake cable at a free end thereof in a cable operating direction, and the brake-actuating mechanism moving the pair of brake shoes away from each other by a cable operating force input to the free end of the brake lever, the cable operating force causes the brake lever and the strut to rotate relatively around a pivotally attached section therebetween, wherein a cable disengagement stopper preventing an inadvertent disengagement of the cable end from the brake lever in cooperation with the free end of the brake lever, is provided on the strut, and when the cable end is operated in the cable operating direction, in a clearance between the stopper and the free end of the brake lever, so as to engage the cable end with the free end of the brake lever, the cable end can pass through the clearance between the stopper and the free end of the brake lever because of the rotation of the brake lever against a spring force of a return spring; and a guide section to pilot a top of a tool is formed on a surface of the brake lever at a side of a cable releasing direction whereby said tool may be used to press the brake lever in the cable operating direction by an external force applied from outside of the brake.

2. The brake cable connecting apparatus as claimed in claim 1, wherein the guide section is configured in a groove on the brake lever.

3. The brake cable connecting apparatus as claimed in claim 1, wherein the guide section is configured in a notch on the brake lever.

* * * * *